(12) United States Patent
Hsu et al.

(10) Patent No.: US 10,235,549 B2
(45) Date of Patent: Mar. 19, 2019

(54) JIG AND MANUFACTURING METHOD FOR FINGERPRINT IDENTIFICATION MODULE

(71) Applicant: Primax Electronics Ltd., Taipei (TW)

(72) Inventors: Mao-Hsiu Hsu, Taipei (TW); Kuan-Pao Ting, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 109 days.

(21) Appl. No.: 15/651,841

(22) Filed: Jul. 17, 2017

(65) Prior Publication Data

US 2018/0253584 A1 Sep. 6, 2018

(30) Foreign Application Priority Data

Mar. 3, 2017 (TW) .............................. 106107025 A (51) Int. Cl.
*G06K 9/00* (2006.01)
(52) U.S. Cl.
CPC ..... *G06K 9/00013* (2013.01); *G06K 9/00087* (2013.01)
(58) Field of Classification Search
CPC ........... G06K 9/00013; G06K 9/00087; G06K 9/00053; H01L 2224/48227; H01L 2924/15174; H01L 27/14683; H01L 41/1132; G06T 2207/30164
See application file for complete search history.

(56) References Cited

U.S. PATENT DOCUMENTS

| | | | | |
|---|---|---|---|---|
| 5,963,657 | A * | 10/1999 | Bowker | G07C 9/00158 340/5.53 |
| 5,963,679 | A * | 10/1999 | Setlak | G06K 9/0002 382/115 |
| 6,307,258 | B1 * | 10/2001 | Crane, Jr. | H01L 23/057 257/680 |
| 6,672,174 | B2 * | 1/2004 | Deconde | G06K 9/0002 73/862.046 |
| 6,924,496 | B2 * | 8/2005 | Manansala | G06K 9/00053 250/239 |
| 7,479,039 | B2 * | 1/2009 | Ni | G06F 12/1416 439/620.15 |
| 7,699,619 | B2 * | 4/2010 | Mizumura | H01R 13/6582 439/71 |
| 7,953,257 | B2 * | 5/2011 | Chen | G06K 9/00053 361/220 |

(Continued)

*Primary Examiner* — Manav Seth
(74) *Attorney, Agent, or Firm* — Kirton McConkie; Evan R. Witt (57) ABSTRACT

A jig for a fingerprint identification module includes a base, a top cover and a rotating shaft. The rotating shaft is connected with the base or the top cover. The base includes plural accommodation spaces. A circuit board and a fingerprint sensor fixed on the circuit board are accommodated within the corresponding accommodation space. The top cover is fixed on the base in response to a magnetic attraction force. The top cover includes plural perforations corresponding to the plural accommodation spaces. When an output element is penetrated through a specified perforation, an isolation material is outputted from the output element and placed on a periphery of a junction between the circuit board and the fingerprint sensor.

14 Claims, 6 Drawing Sheets

(56) References Cited

U.S. PATENT DOCUMENTS

| | | | |
|---|---|---|---|
| 8,717,775 B1* | 5/2014 | Bologna | G06K 9/00053 361/761 |
| 9,629,268 B2* | 4/2017 | Lee | H05K 5/0247 |
| 9,959,444 B2* | 5/2018 | Young | G06K 9/00013 |
| 10,133,910 B2* | 11/2018 | Chang | G06K 9/00053 |
| 2002/0081780 A1* | 6/2002 | Salatino | G06K 9/0002 438/127 |
| 2003/0170933 A1* | 9/2003 | Manansala | G06K 9/0002 438/116 |
| 2003/0224553 A1* | 12/2003 | Manansala | G06K 9/00053 438/106 |
| 2004/0063246 A1* | 4/2004 | Karnezos | H01L 23/3128 438/108 |
| 2005/0030724 A1* | 2/2005 | Ryhanen | A61B 5/117 361/760 |
| 2005/0156362 A1* | 7/2005 | Arnold | C04B 41/009 264/618 |
| 2005/0184855 A1* | 8/2005 | Burchette, Jr. | B60R 25/00 340/5.53 |
| 2006/0083411 A1* | 4/2006 | Benkley, III | G06K 9/00053 382/124 |
| 2006/0223216 A1* | 10/2006 | Chang | H01L 25/167 438/64 |
| 2017/0364726 A1* | 12/2017 | Buchan | G06K 9/0002 |

* cited by examiner

JIG AND MANUFACTURING METHOD FOR FINGERPRINT IDENTIFICATION MODULE

FIELD OF THE INVENTION

The present invention relates to an identity identification element, and more particularly to a fingerprint identification module for identifying the identity of a user through a fingerprint.

BACKGROUND OF THE INVENTION

Recently, a fingerprint identification technology has been widely applied to a variety of electronic products. By using the fingerprint identification technology, the user's fingerprint can be inputted into an electronic product and saved in the electronic product. For unlocking the electronic product, the user has to input the fingerprint through a fingerprint identification module. The way of unlocking the electronic product by the fingerprint identification technology is faster and more user-friendly than the way of manually inputting the password. Consequently, the fingerprint identification technology is favored by many users, and the demands on the fingerprint identification module are gradually increased.

Figure 1:
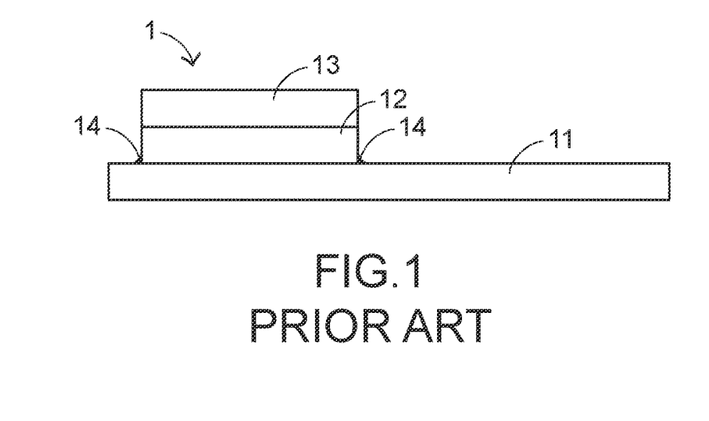
FIG. 1 schematically illustrates a structure of a conventional fingerprint identification module.

FIG. 1 schematically illustrates a structure of a conventional fingerprint identification module. As shown in FIG. 1, the conventional fingerprint identification module 1 comprises a circuit board 11, a fingerprint sensor 12 and a covering plate 13. The fingerprint sensor 12 is disposed on the circuit board 11. Moreover, the fingerprint sensor 12 is electrically connected with the circuit board 11 to acquire electric power from the circuit board 11. The covering plate 13 is disposed on the fingerprint sensor 12. The covering plate 13 is used as a contact interface between the user's finger and the fingerprint sensor 12. Moreover, the covering plate 13 can protect the surface of the fingerprint sensor 12. Consequently, even if the fingerprint sensor 12 is frequently contacted with the user's finger, the surface of the fingerprint sensor 12 is not damaged. When the user's finger is placed on the covering plate 13, the fingerprint image of the user's finger is sensed by the fingerprint sensor 12. The fingerprint image sensed by the fingerprint sensor 12 is transmitted to the electronic device through the circuit board 11 so as to be recognized.

Figure 2:
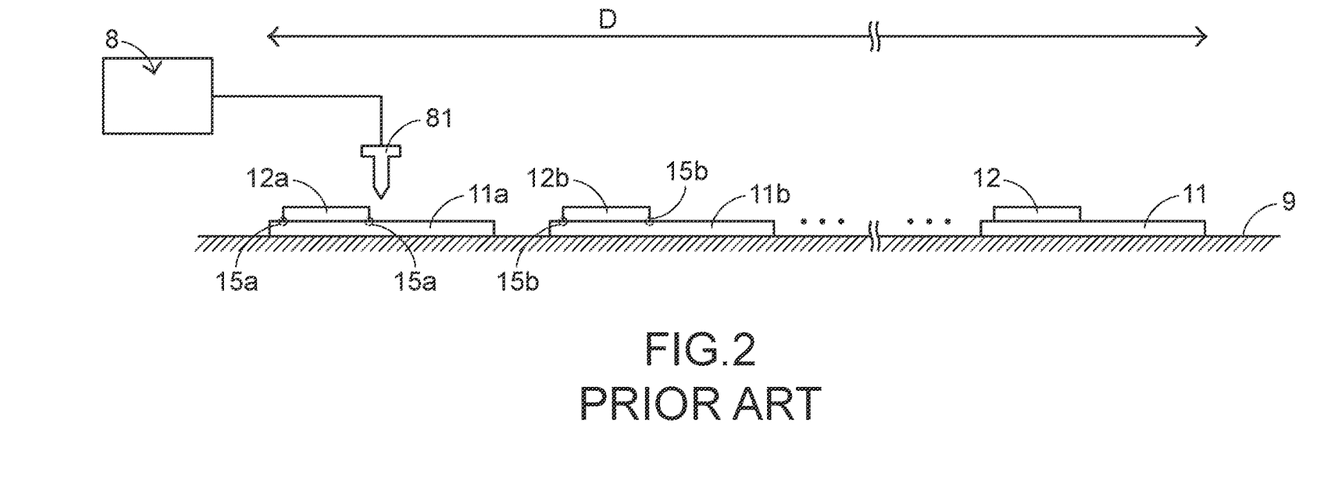
FIG. 2 schematically illustrates the device of dispensing glue on the periphery of the junction between the circuit board and the fingerprint sensor during the manufacturing process of the conventional fingerprint identification module.

For preventing moisture or dust from entering the region between the circuit board 11 and the fingerprint sensor 12, the periphery of the junction between the circuit board 11 and the fingerprint sensor 12 is usually coated with an isolation material such as glue 14. FIG. 2 schematically illustrates the device of dispensing glue on the periphery of the junction between the circuit board and the fingerprint sensor during the manufacturing process of the conventional fingerprint identification module. As shown in FIG. 2, the production line of the conventional fingerprint identification module 1 comprises a working platform 9 and a dispenser 8. Firstly, plural assemblies of circuit boards 11 and corresponding fingerprint sensors 12 are fixed on the working platform 9. Then, a dispensing needle 81 is moved to a position over a circuit board 11a under control of the dispenser 8. Then, the dispensing needle 81 is moved downwardly and contacted with the periphery 15a of the junction between the circuit board 11a and the overlying fingerprint sensor 12a, and a glue dispensing operation is performed on the periphery 15a. After the glue dispensing operation is completed, the dispensing needle 81 is moved to a position over a next circuit board 11b under control of the dispenser 8. Then, the dispensing needle 81 is moved downwardly and contacted with the periphery 15b of the junction between the circuit board 11b and the overlying fingerprint sensor 12b, and a glue dispensing operation is performed on the periphery 15b. The above steps are repeatedly done until the peripheries of the junctions between the circuit boards and the overlying fingerprint sensors on the working platform 9 are all coated with the glue 14, which is used for isolating the moisture or dust. Afterwards, the circuit boards 11 are removed from the working platform 9, and placed into a baking apparatus (not shown). Consequently, the glue 14 between each circuit board 11 and the overlying fingerprint sensor 12 is solidified.

However, the above process still has two drawbacks. Firstly, the travelling distance of the dispensing needle 81 is too long. That is, the travelling distance covers the layout range D of all circuit boards 11 (see FIG. 2). Consequently, the production line occupies a lot of space. Secondly, the process is very complicated. For example, after the glue dispensing operations are completed, the circuit boards 11 are sequentially removed from the working platform 9 and then sequentially placed into the baking apparatus. After the baking process is completed, the circuit boards 11 are sequentially removed from the baking apparatus. In other words, the method of manufacturing the fingerprint identification module needs to be further improved.

SUMMARY OF THE INVENTION

An object of the present invention provides a jig for a fingerprint identification module in order to reduce the required space of the production line and simplify the production process.

Another object of the present invention provides a method for manufacturing a fingerprint identification module using the jig of the present invention.

In accordance with an aspect of the present invention, there is provided a jig for a fingerprint identification module. The jig includes a base, a top cover and a rotating shaft. The base includes plural accommodation spaces. A circuit board and a fingerprint sensor fixed on the circuit board are accommodated within the corresponding accommodation space. The top cover includes plural perforations corresponding to the plural accommodation spaces. When an output element is penetrated through a specified perforation of the plural perforations corresponding to the circuit board and moved within the specified perforation, an isolation material is outputted from the output element and placed on a periphery of a junction between the circuit board and the fingerprint sensor. The top cover is fixed on the base in response to a magnetic attraction force. The rotating shaft is connected with the base or the top cover. When the rotating shaft is driven and rotated, the base and the top cover fixed on the base are synchronously rotated.

In accordance with another aspect of the present invention, there is provided a manufacturing method of a fingerprint identification module. The manufacturing method includes the following steps. Firstly, plural circuit boards are placed in plural accommodation spaces of a base, wherein plural fingerprint sensors are fixed on the plural circuit boards, respectively. Then, a top cover is fixed on the base in response to a magnetic attraction force, wherein plural perforations of the top cover are aligned with the corresponding accommodation spaces of the base. Then, an output element is penetrated through a first perforation of the plural perforations of the base, the output element is moved, and an isolation material is placed on a periphery of a junction between the circuit board and the fingerprint sensor corresponding to the first perforation so as to isolate moisture or dust. Then, the top cover and the base are rotated synchronously. Then, the output element is penetrated through a second perforation of the plural perforations of the base, the output element is moved, and the isolation material is placed on a periphery of a junction between the circuit board and the fingerprint sensor corresponding to the second perforation so as to isolate moisture or dust.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 3:
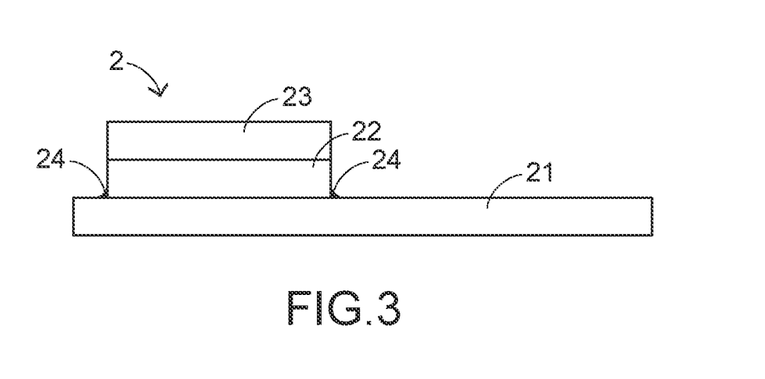
FIG. 3 schematically illustrates a structure of a fingerprint identification module according to an embodiment of the present invention.
Figure 4:
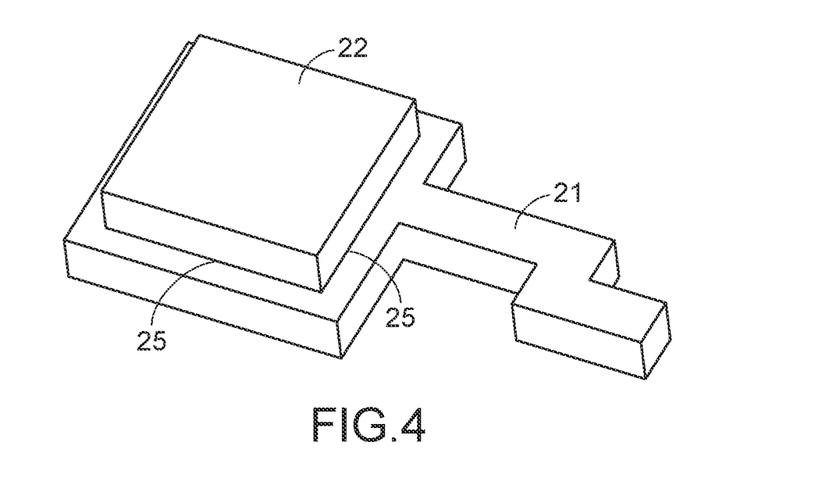
FIG. 4 is a schematic perspective view illustrating the fingerprint identification module of FIG. 3 before a foreign matter isolating process is performed on a circuit board and a fingerprint sensor.

The present invention provides a jig for producing or manufacturing a fingerprint identification module. It is noted that the jig is not restricted to manufacture the fingerprint identification module. Hereinafter, the structure of the fingerprint identification module will be described with reference to FIGS. 3 and 4. FIG. 3 schematically illustrates a structure of a fingerprint identification module according to an embodiment of the present invention. FIG. 4 is a schematic perspective view illustrating the fingerprint identification module of FIG. 3 before a foreign matter isolating process is performed on a circuit board and a fingerprint sensor. As shown in FIGS. 2 and 3, the fingerprint identification module 2 comprises a circuit board 21, a fingerprint sensor 22 and a covering plate 23. The fingerprint sensor 22 is disposed on the circuit board 21. Moreover, the fingerprint sensor 22 is electrically connected with the circuit board 21 to acquire electric power from the circuit board 21. The covering plate 23 is disposed on the fingerprint sensor 22. The covering plate 23 is used as a contact interface between the user's finger and the fingerprint sensor 22. Moreover, the covering plate 23 can protect the surface of the fingerprint sensor 22. Consequently, even if the fingerprint sensor 22 is frequently contacted with the user's finger, the surface of the fingerprint sensor 22 is not damaged. When the user's finger is placed on the covering plate 23, the fingerprint image of the user's finger is sensed by the fingerprint sensor 22. The fingerprint image sensed by the fingerprint sensor 22 is transmitted to the electronic device through the circuit board 21 so as to be recognized. Preferably but not exclusively, the fingerprint sensor 22 is a fingerprint sensing chip. Moreover, the fingerprint sensor 22 is fixed on the circuit board 21 through a surface mount technology (SMT) or an anisotropic conductive film (ACF). Moreover, the covering plate 23 is a glass plate or a ceramic plate.

Figure 5:
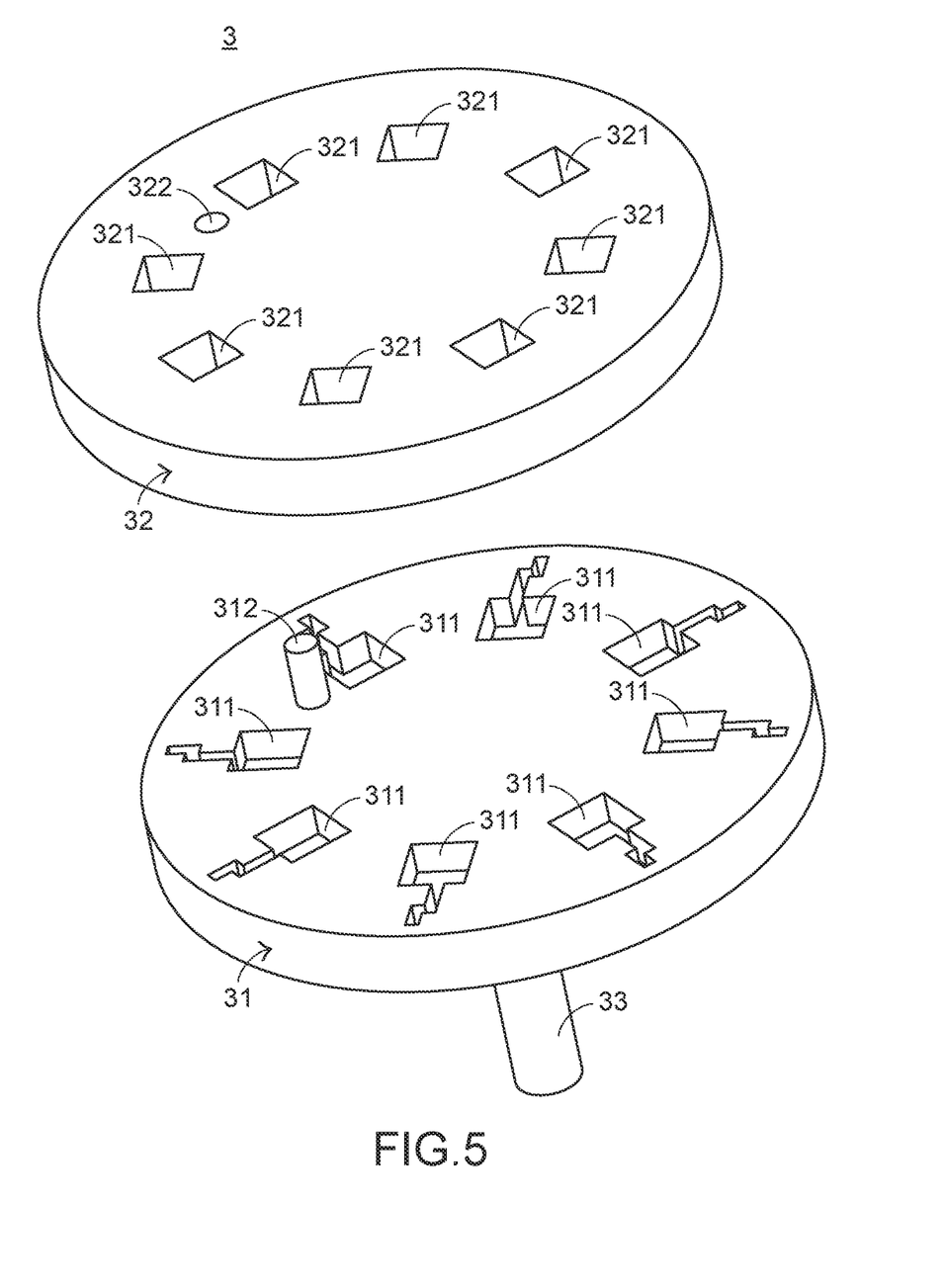
FIG. 5 is a schematic exploded view illustrating a jig for manufacturing the fingerprint identification module of the present invention.
Figure 6:
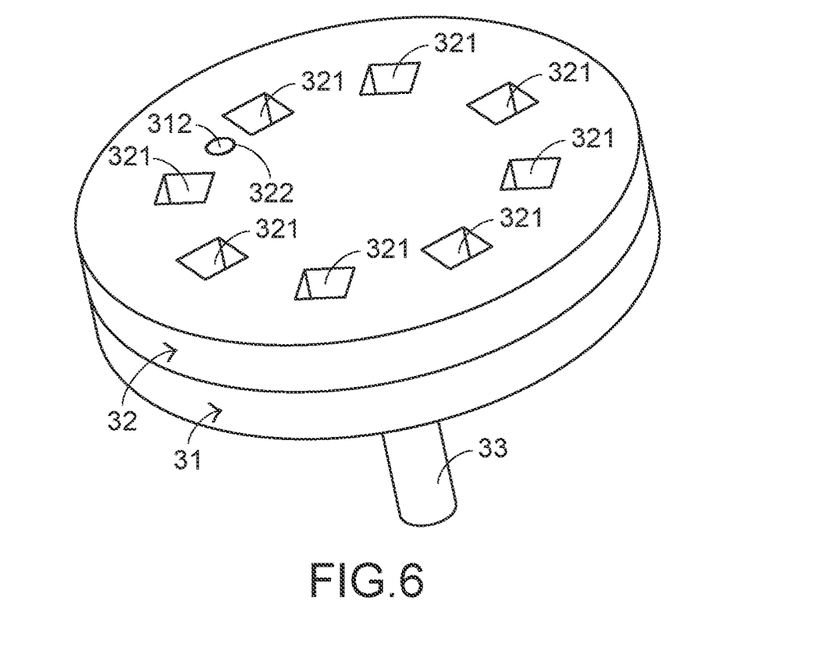
FIG. 6 is a schematic assembled view illustrating the combination of a top cover and a base of the jig of FIG. 5.

Hereinafter, a jig for manufacturing the fingerprint identification module of the present invention will be illustrated with reference to FIGS. 5 and 6. FIG. 5 is a schematic exploded view illustrating a jig for manufacturing the fingerprint identification module of the present invention. FIG. 6 is a schematic assembled view illustrating the combination of a top cover and a base of the jig of FIG. 5. As shown in FIGS. 5 and 6, the jig 3 comprises a base 31, a top cover 32 and a rotating shaft 33. The base 31 comprises plural accommodation spaces 311. Each accommodation space 311 is used for accommodating one circuit board 21 and the overlying fingerprint sensor 22, which are shown in FIG. 4. The top cover 32 is fixed on the base 31 in response to a magnetic attraction force. Moreover, the top cover 32 comprises plural perforations 321 corresponding to the plural accommodation spaces 311. The rotating shaft 33 is connected with the base 31 or the top cover 32. When the rotating shaft 33 is driven to rotate, the base 31 and the top cover 32 fixed on the base 31 are synchronously rotated.

Figure 7:
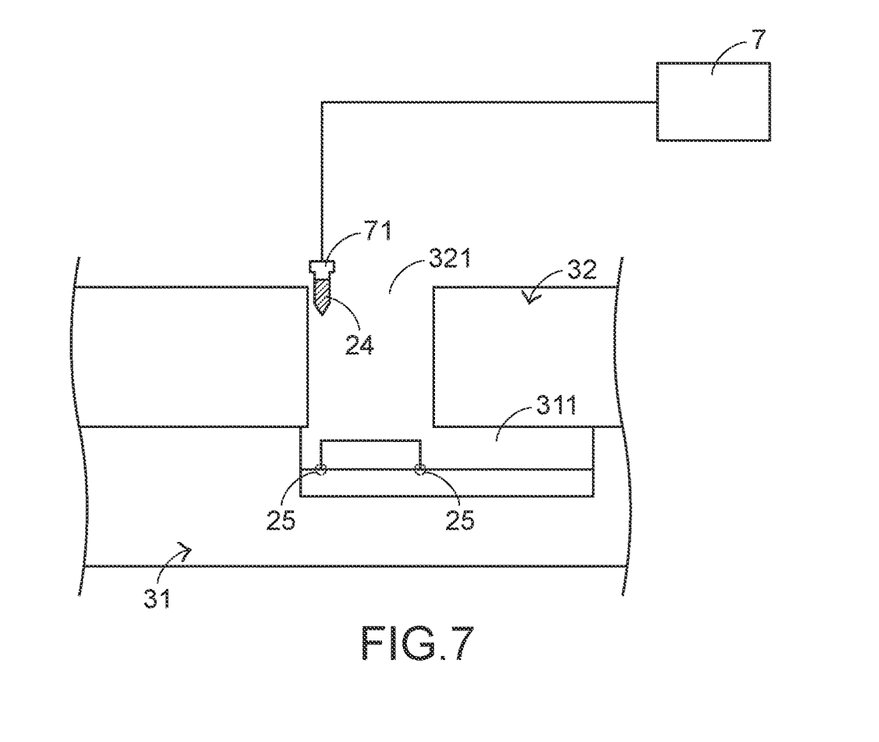
FIG. 7 schematically illustrates the use of the jig of FIG. 5 to perform the foreign matter isolating process on the circuit board and the fingerprint sensor of the fingerprint identification module.

When the top cover 32 is fixed on the base 31, the plural perforations 321 of the top cover 32 are aligned with the corresponding accommodation spaces 311 of the base 31. The area of each perforation 321 is slightly larger than the area of the fingerprint sensor 22. Moreover, an output element is allowed to be penetrated through the perforation 321 and moved within the perforation 321. Consequently, the output element is contacted with the periphery of the junction between the circuit board 21 and the fingerprint sensor 22. Moreover, an isolation material is outputted from the output element and placed on the periphery of the junction between the circuit board 21 and the fingerprint sensor 22 in order to isolate the foreign matter such as moisture or dust. Preferably but not exclusively, the rotating shaft 33 is connected with the base 31, a glue 24 is used as the isolation material, and the output element is a dispensing needle 71 of the dispenser 7 (see FIG. 7).

Preferably, the jig 3 is a heat-resistant jig. Consequently, after the jig 3 undergoes a baking process, the jig 3 is not suffered from deformation. Moreover, the base 31 further comprises a first coupling material and a first positioning part, and the top cover 32 further comprises a second coupling material and a second positioning part. According to the first positioning part and the second positioning part, the plural perforations 321 of the top cover 32 are aligned with the corresponding accommodation spaces 311 of the base 31. Moreover, the magnetic attraction force is generated by the first coupling material and the second coupling material. After the base 31 and the top cover 32 are aligned with each other, the base 31 and the top cover 32 are combined together in response to the magnetic attraction force.

In an embodiment, the first coupling material is a magnetic material, and the second coupling material is made of a metallic material. Consequently, the base 31 is a magnetic base, and the top cover 32 is a metallic cover. Moreover, the first positioning part is a positioning post 312 that is formed on the base 31, and the second positioning part is a positioning hole 322 that is formed in the top cover 32. Then, the top cover 32 is moved downwardly and placed on the base 31 while the positioning post 312 of the base 31 is penetrated through the positioning hole 322 of the top cover 32. Consequently, the plural perforations 321 of the top cover 32 are aligned with the corresponding accommodation spaces 311 of the base 31. It is noted that numerous modifications and alterations may be made while retaining the teachings of the invention. For example, in another embodiment, the first positioning part is a positioning hole that is formed in the base 31, and the second positioning part is a positioning post 312 that is formed in the top cover 32.

Figure 8A:
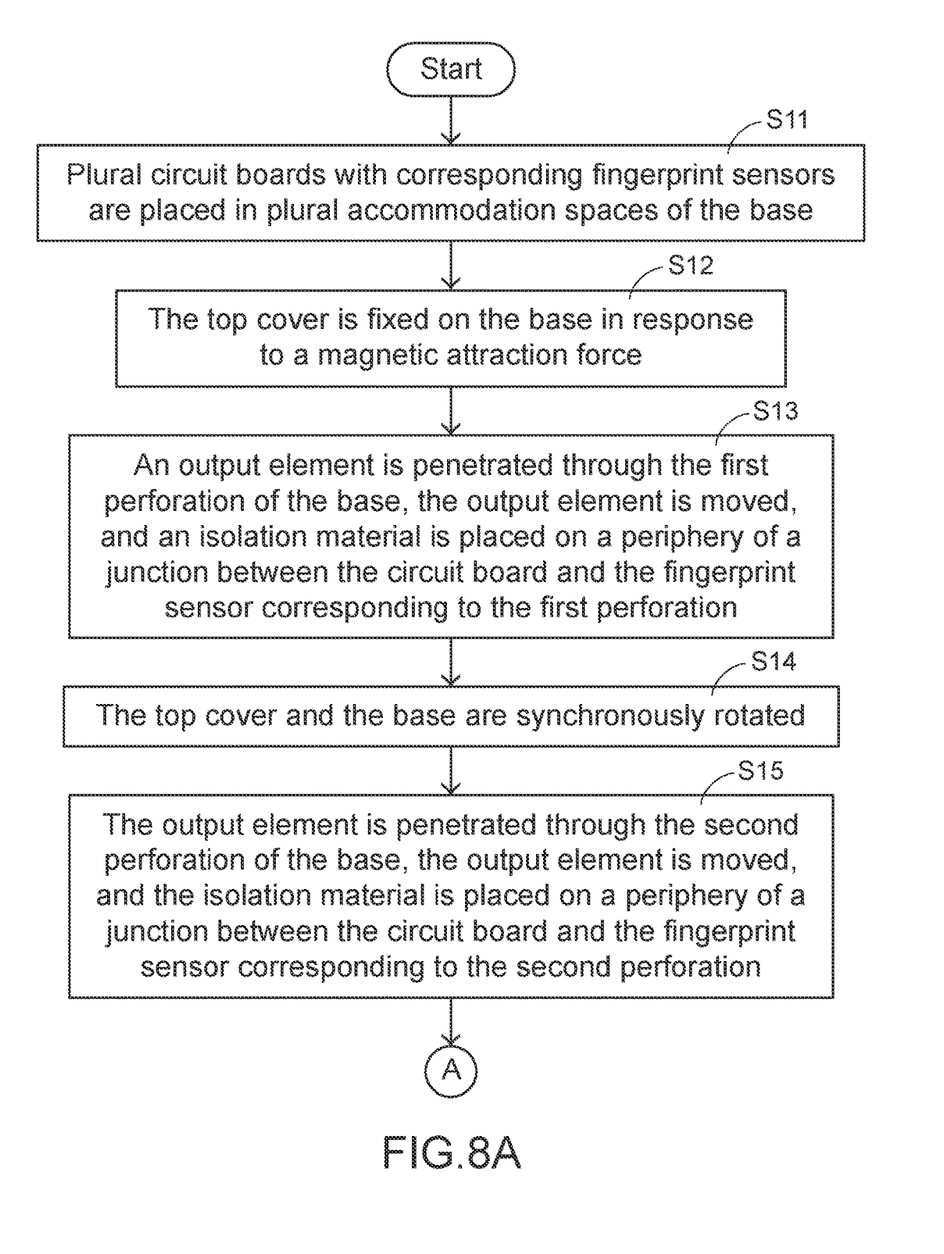
FIG. 8A, 8B are flowcharts illustrating a method of manufacturing the fingerprint identification module according to an embodiment of the present invention.
Figure 8B:
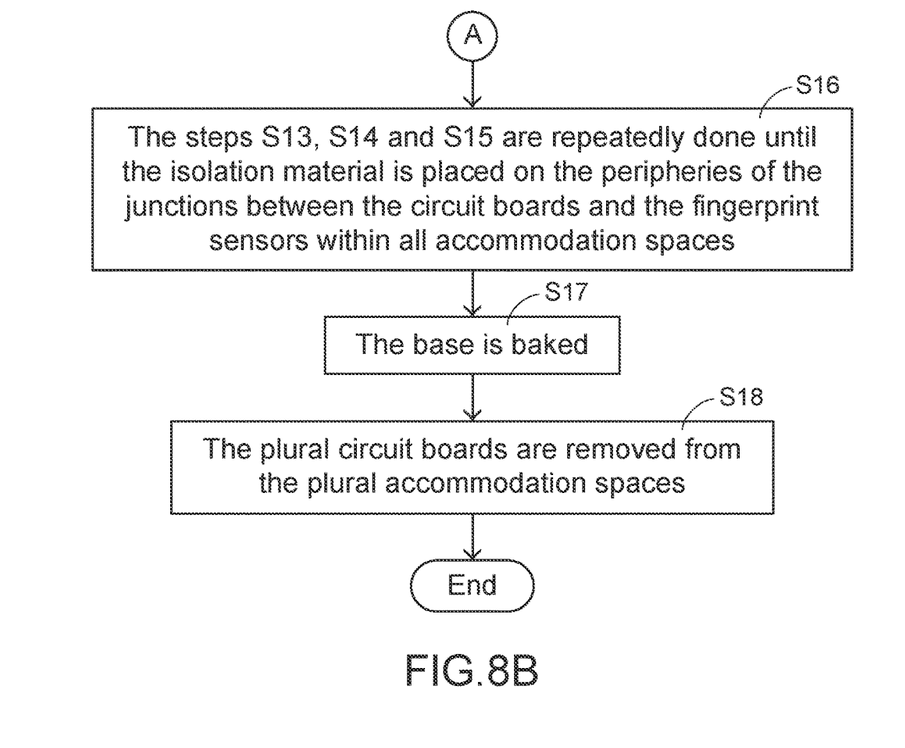

FIG. 8A, 8B are flowcharts illustrating a method of manufacturing the fingerprint identification module according to an embodiment of the present invention. The manufacturing method comprises the following steps.

In a step S11, plural circuit boards 21 with corresponding fingerprint sensors 22 are placed in plural accommodation spaces 311 of the base 31.

In a step S12, the top cover 32 is placed on the base 31 while the positioning post 312 of the base 31 is penetrated through the positioning hole 322 of the top cover 32. Meanwhile, a magnetic attraction force is generated by the top cover 32 and the base 31. Consequently, the top cover 32 is fixed on the base 31 in response to the magnetic attraction force. In addition, the plural perforations 321 of the top cover 32 are aligned with the corresponding accommodation spaces 311 of the base 31.

In a step S13, the dispensing needle 71 is penetrated through a first perforation 321 of the base 31 and contacted with the periphery 25 of the junction between the circuit board 21 and the fingerprint sensor 22 corresponding to the first perforation. Moreover, the dispensing needle 71 is moved along the periphery 25 of the junction between the circuit board 21 and the fingerprint sensor 22, and the glue 24 is formed on the periphery 25 so as to isolate the ambient moisture or dust.

In a step S14, the rotating shaft 33 is rotated. Consequently, the base 31 and the top cover 32 fixed on the base 31 are synchronously rotated, and the dispensing needle 71 is aligned with a second perforation 321 of the base 31.

In a step S15, the dispensing needle 71 is penetrated through a second perforation 321 of the base 31 and contacted with the periphery 25 of the junction between the circuit board 21 and the fingerprint sensor 22 corresponding to the second perforation. Moreover, the dispensing needle 71 is moved along the periphery 25 of the junction between the circuit board 21 and the fingerprint sensor 22, and the glue 24 is formed on the periphery 25 so as to isolate the ambient moisture or dust.

In a step S16, the above steps S13, S14 and S15 are repeatedly done until the glue 24 is formed on the peripheries 25 of the junctions between the circuit boards 21 and the fingerprint sensors 22 within all accommodation spaces 311 of the base 31.

In a step S17, the jig 3 is placed in a baking apparatus (not shown). After the jig 3 undergoes a baking process, the glue 24 is formed on the junctions between the circuit boards 21 and the fingerprint sensors 22 within all accommodation spaces 311 of the base 31 is solidified.

In a step S18, the plural circuit boards 21 are removed from the plural accommodation spaces 311 of the base 31.

From the above descriptions, the present invention provides a jig and a manufacturing method for a fingerprint identification module. In accordance with the present invention, the output element for dispensing the isolation material is only allowed to be moved in the range of any perforation of the top cover of the jig. Since the travelling distance is largely reduced, the layout space of the production line is saved. According to the conventional technology, the circuit boards coated with the isolation material are sequentially removed from the jig and sequentially placed into the baking apparatus. In accordance with the technology of the present invention, the entire of the jig is directly baked and then the circuit boards are removed from the jig. Since the process of manufacturing the fingerprint identification module is simplified according to the present invention, the manufacturing efficiency is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A jig for a fingerprint identification module, the jig comprising:
    a base comprising plural accommodation spaces, wherein a circuit board and a fingerprint sensor fixed on the circuit board are accommodated within the corresponding accommodation space;
    a top cover comprising plural perforations corresponding to the plural accommodation spaces, wherein when an output element is penetrated through a specified perforation of the plural perforations corresponding to the circuit board and moved within the specified perforation, an isolation material is outputted from the output element and placed on a periphery of a junction between the circuit board and the fingerprint sensor, wherein the top cover is fixed on the base in response to a magnetic attraction force; and
    a rotating shaft connected with the base or the top cover, wherein when the rotating shaft is driven and rotated, the base and the top cover fixed on the base are synchronously rotated.

2. The jig according to claim 1, wherein the base further comprises a first coupling material, and the top cover further comprises a second coupling material, wherein the magnetic attraction force is generated by the first coupling material and the second coupling material.

3. The jig according to claim 1, wherein the fingerprint sensor is a fingerprint sensing chip.

4. The jig according to claim 1, wherein the isolation material is glue, and the glue is outputted from the output element and dispensed on the periphery of the junction between the circuit board and the fingerprint sensor so as to isolate moisture or dust.

5. The jig according to claim 4, wherein after the isolation material is dispensed on the periphery of the junction between the circuit board and the fingerprint sensor within the corresponding accommodation space, the jig is baked.

6. The jig according to claim 1, wherein the base further comprises a first positioning part, and the top cover further comprises a second positioning part, wherein the plural perforations of the top cover are aligned with the corresponding accommodation spaces of the base according to the first positioning part and the second positioning part.

7. The jig according to claim 6, wherein one of the first positioning part and the second positioning part is a positioning post, and the other of the first positioning part and the second positioning part is a positioning hole.

8. A manufacturing method of a fingerprint identification module, the manufacturing method comprising steps of:
   placing plural circuit boards in plural accommodation spaces of a base, wherein plural fingerprint sensors are fixed on the plural circuit boards, respectively;
   fixing a top cover on the base in response to a magnetic attraction force, wherein plural perforations of the top cover are aligned with the corresponding accommodation spaces of the base;
   penetrating an output element through a first perforation of the plural perforations of the base, moving the output element, and placing an isolation material on a periphery of a junction between the circuit board and the fingerprint sensor corresponding to the first perforation so as to isolate moisture or dust;
   rotating the top cover and the base synchronously; and
   penetrating the output element through a second perforation of the plural perforations of the base, moving the output element, and placing the isolation material on a periphery of a junction between the circuit board and the fingerprint sensor corresponding to the second perforation so as to isolate moisture or dust.

9. The manufacturing method according to claim 8, further comprising steps of:
   baking the substrate; and
   removing the plural circuit boards from the plural accommodation spaces.

10. The manufacturing method according to claim 8, wherein the base further comprises a first coupling material, and the top cover further comprises a second coupling material, wherein the magnetic attraction force is generated by the first coupling material and the second coupling material.

11. The manufacturing method according to claim 8, wherein the fingerprint sensor is a fingerprint sensing chip.

12. The manufacturing method according to claim 8, wherein the isolation material is glue, and the glue is outputted from the output element and dispensed on the periphery of the junction between each circuit board and the corresponding fingerprint sensor.

13. The manufacturing method according to claim 8, wherein the base further comprises a first positioning part, and the top cover further comprises a second positioning part, wherein the plural perforations of the top cover are aligned with the corresponding accommodation spaces of the base according to the first positioning part and the second positioning part.

14. The manufacturing method according to claim 13, wherein one of the first positioning part and the second positioning part is a positioning post, and the other of the first positioning part and the second positioning part is a positioning hole.

* * * * *